(12) United States Patent
Trimble

(10) Patent No.: US 7,340,892 B1
(45) Date of Patent: *Mar. 11, 2008

(54) CHARGE PUMP

(75) Inventor: Robert E. Trimble, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/623,548

(22) Filed: Jan. 16, 2007

Related U.S. Application Data

(63) Continuation of application No. 10/897,960, filed on Jul. 23, 2004, now Pat. No. 7,168,247.

(60) Provisional application No. 60/489,617, filed on Jul. 24, 2003.

(51) Int. Cl.
*F16D 31/02* (2006.01)

(52) U.S. Cl. ...................................... 60/488

(58) Field of Classification Search ............... 60/488
See application file for complete search history.

(56) References Cited

U.S. PATENT DOCUMENTS

| | | | |
|---|---|---|---|
| 3,348,491 A | 10/1967 | Stephens et al. | |
| 3,563,674 A | 2/1971 | Moffat et al. | |
| 3,736,072 A | 5/1973 | Turner et al. | |
| 3,922,113 A | 11/1975 | Turner | |
| 3,946,562 A | 3/1976 | Ross | |
| 4,002,028 A | 1/1977 | Budzich | |
| 4,341,073 A | 7/1982 | Spivey | |
| 4,408,961 A | 10/1983 | Laybourne | |
| 4,723,571 A | 2/1988 | Haynes | |
| 5,037,247 A | 8/1991 | Kaiser et al. | |
| 5,555,727 A | 9/1996 | Hauser et al. | |
| 5,628,189 A | 5/1997 | Hauser et al. | |
| 5,715,798 A | 2/1998 | Bacon et al. | |
| 5,819,535 A | 10/1998 | Smothers et al. | |
| 5,979,270 A | 11/1999 | Thoma et al. | |
| RE36,807 E | 8/2000 | Okada | |
| 6,572,339 B2 | 6/2003 | Walton et al. | |
| 6,575,705 B2 | 6/2003 | Akiyama et al. | |
| 6,953,327 B1 | 10/2005 | Hauser et al. | |
| 7,007,468 B1 | 3/2006 | Bennett et al. | |
| 7,168,247 B1 * | 1/2007 | Trimble ..................... | 60/488 |

* cited by examiner

*Primary Examiner*—F. Daniel Lopez
(74) *Attorney, Agent, or Firm*—Neal, Gerber & Eisenberg LLP

(57) ABSTRACT

A charge pump for hydraulic drive device such as a hydrostatic transmission or integrated hydrostatic transaxle using hydraulic porting having first and second pressure sides mounted in a sump to connect a hydraulic pump and motor. The charge pump comprises a body connected between the first and second pressure sides of the porting to pull hydraulic fluid from a charge sump to the low pressure side of the porting, when the second pressure side is under low pressure.

22 Claims, 9 Drawing Sheets

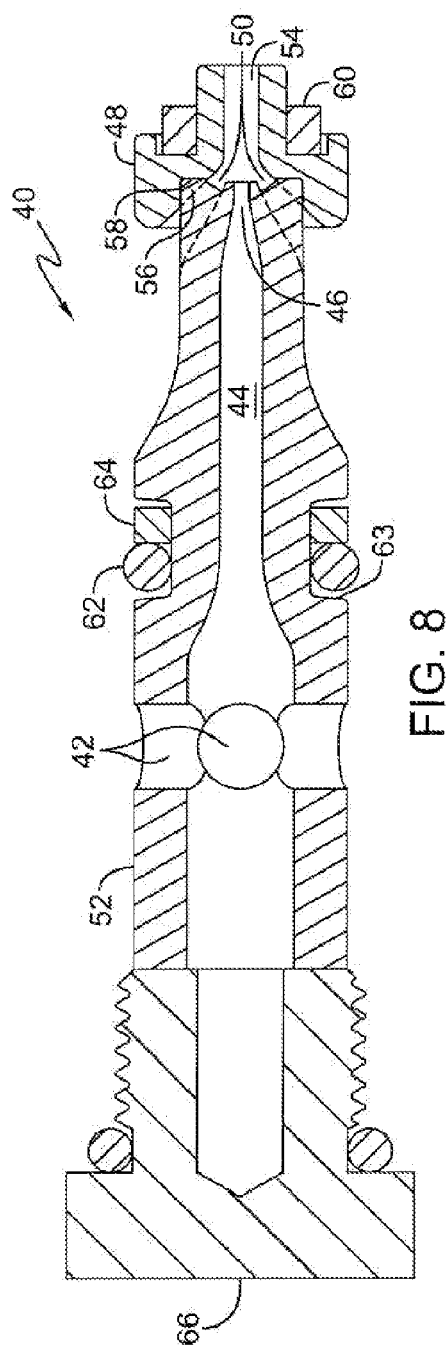
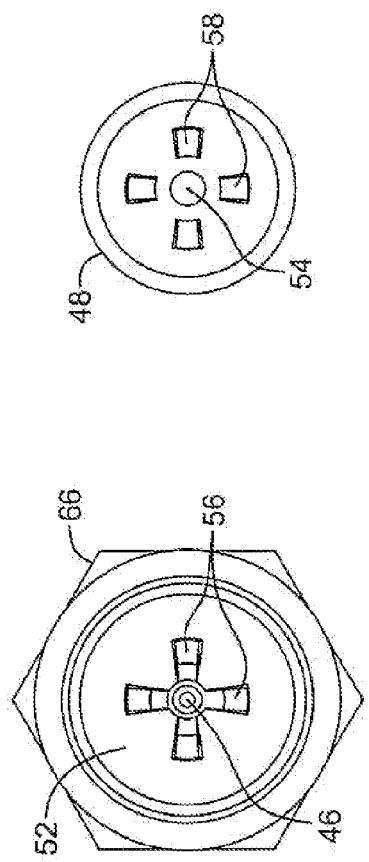
FIG. 8
FIG. 9
FIG. 10

CHARGE PUMP

CROSS-REFERENCE TO RELATED APPLICATION

This patent application is a continuation of U.S. patent application Ser. No. 10/897,960 filed on Jul. 23, 2004 now U.S. Pat. No. 7,168,247, which claims priority of U.S. Patent Application No. 60/489,617 filed on Jul. 24, 2003, both of which are incorporated herein by reference in their entirety.

FIELD OF THE INVENTION

This invention relates generally to the design of a charge pump for hydrostatic transmissions and hydraulic pumps. Hydrostatic transmissions come in a variety of configurations, including parallel pump and motor, dual pump and motor, and configurations where the hydrostatic transmission is incorporated within a housing containing gearing, often known as an integrated hydrostatic transaxle or IHT.

BACKGROUND OF THE INVENTION

Charge pumps commonly used in association with hydrostatic pumps and transmissions are of the gerotor type. One such charge pump is shown in U.S. Pat. No. 5,557,931, the terms of which are incorporated herein by reference. The charge pump shown in that patent is affixed to an exterior surface of the housing and is driven by an input shaft. In another known configuration, the charge pump is located within the same housing as the center section on which rotating components are mounted, in the space between the center section and an internal surface of the housing.

While these charge pumps serve an important function, they are relatively costly. Furthermore, in the aforementioned designs the charge pumps are attached at a position on the underside of a center section, potentially increasing the required housing size and/or reducing ground clearance. Also, it is often necessary to provide complicated connections between the prior art charge pump and the hydraulic porting of a pump or hydrostatic transmission. Thus, there is a need for a charge pump of reduced size, complexity and cost.

SUMMARY OF THE INVENTION

A charge pump that makes use of the Venturi principle is disclosed herein. This charge pump is positioned within a center section and operates passively to provide fluid to the porting of a hydraulic system. Such a pump may also be referred to as a jet pump. A pump cartridge desirable for high-volume production is also disclosed herein.

Other benefits and objects of this invention are disclosed herein and will be obvious to readers of ordinary skill in the art. The features disclosed herein can be combined to create a unique design; it is understood, however, that such features are unique in their own right and can be used independently with other transmission, transaxle or vehicle designs, as will be obvious to one of ordinary skill in the art.

BRIEF DESCRIPTION OF THE DRAWINGS

FIG. 8 is a section view of the charge pump of FIG. 6 similar to the section shown in FIG. 5.

FIG. 9 is an end view of the charge pump body.

FIG. 10 is an end view of the exit nozzle portion of the charge pump assembly.

DETAILED DESCRIPTION OF THE DRAWINGS

Figure 1:
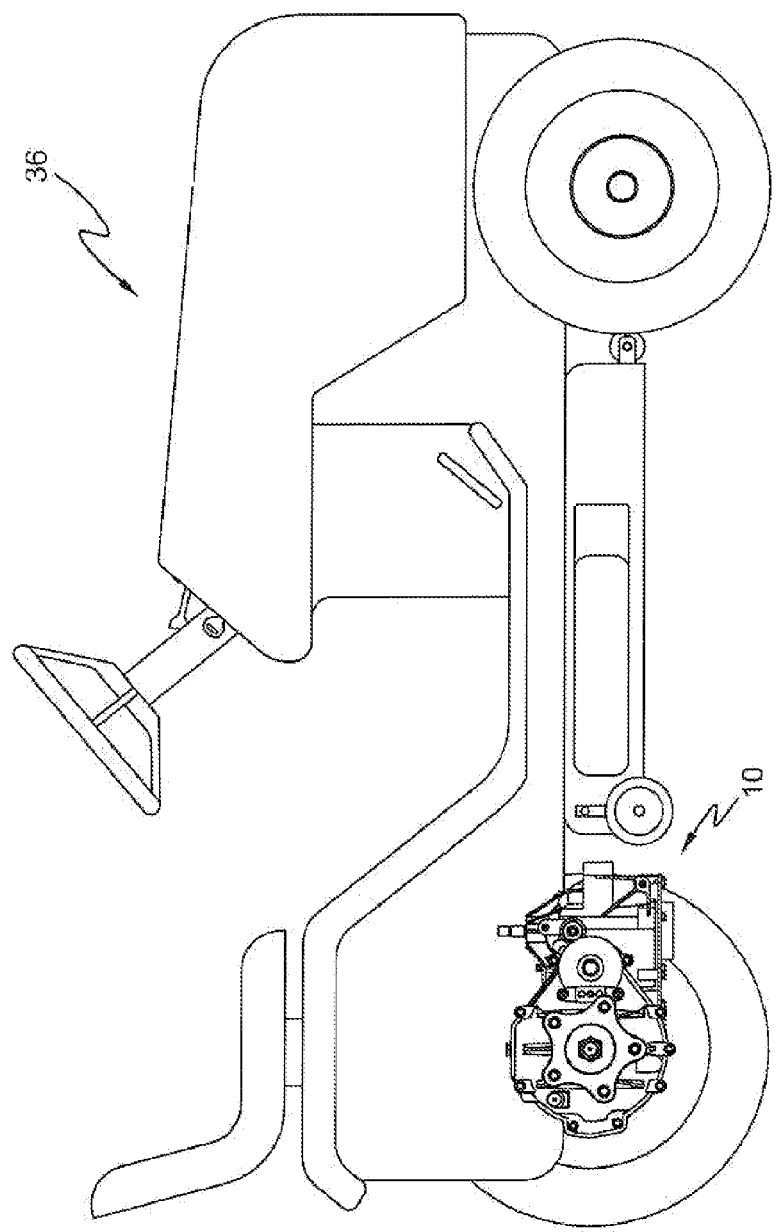
FIG. 1 is a side elevation view of a vehicle incorporating a hydrostatic transaxle incorporating the invention.

FIG. 1 shows a simplified vehicle 36 in which an exemplary hydrostatic transaxle 10 is mounted. The invention will be described within the context of integrated hydrostatic transaxle 10, as shown in more detail in FIGS. 2-4. Transaxle 10 is generally similar to that depicted in U.S. Pat. No. 5,782,717, the terms of which are incorporated herein by reference. However, the invention is suitable for use in any pump and motor configuration wherein the pump and motor are connected by porting to form a generally closed loop system, and wherein the pump may be installed to interface with the two sides of the closed loop system and a system sump or reservoir.

Figure 2:
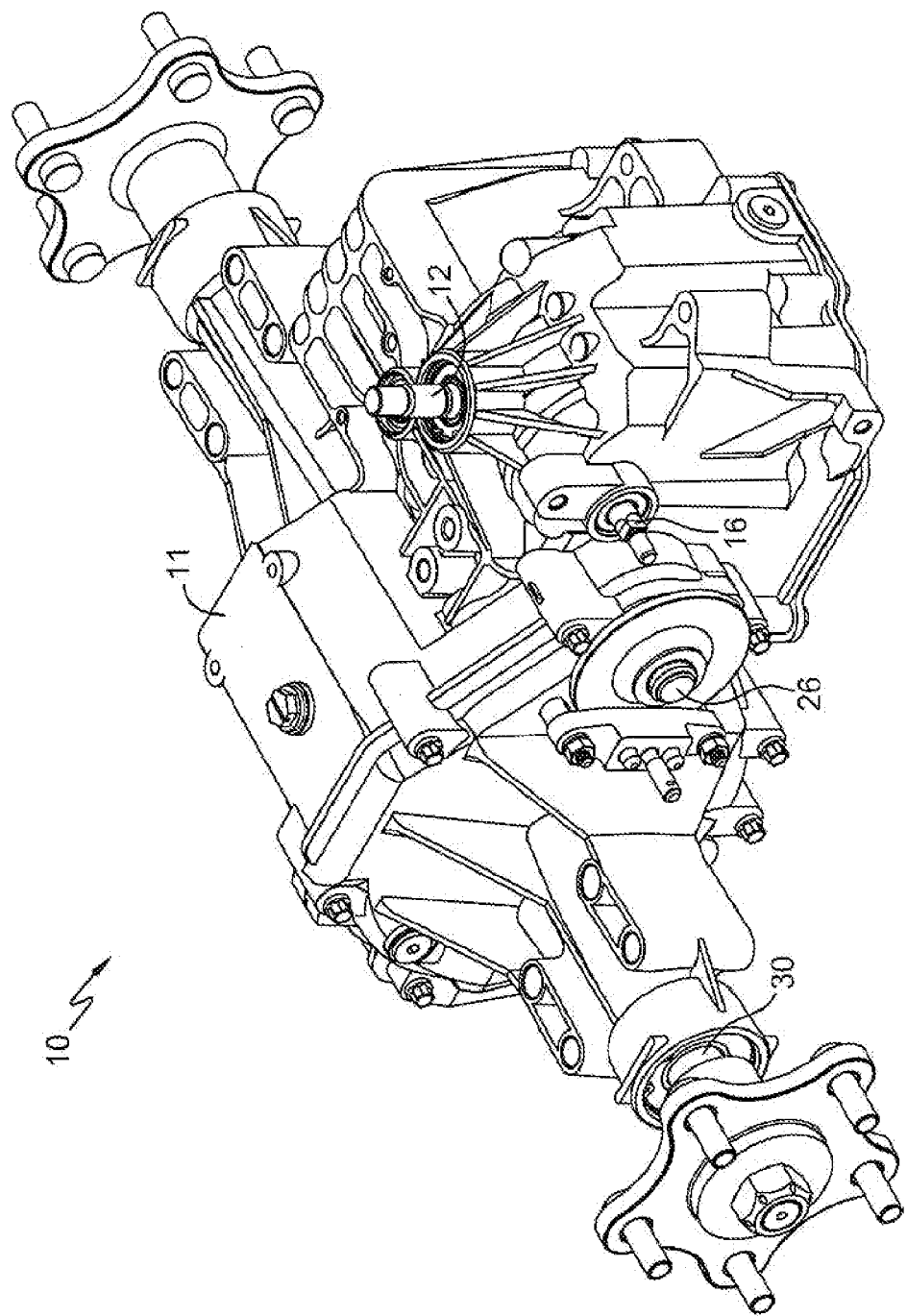
FIG. 2 is a perspective view of the transaxle shown in FIG. 1.
Figure 3:
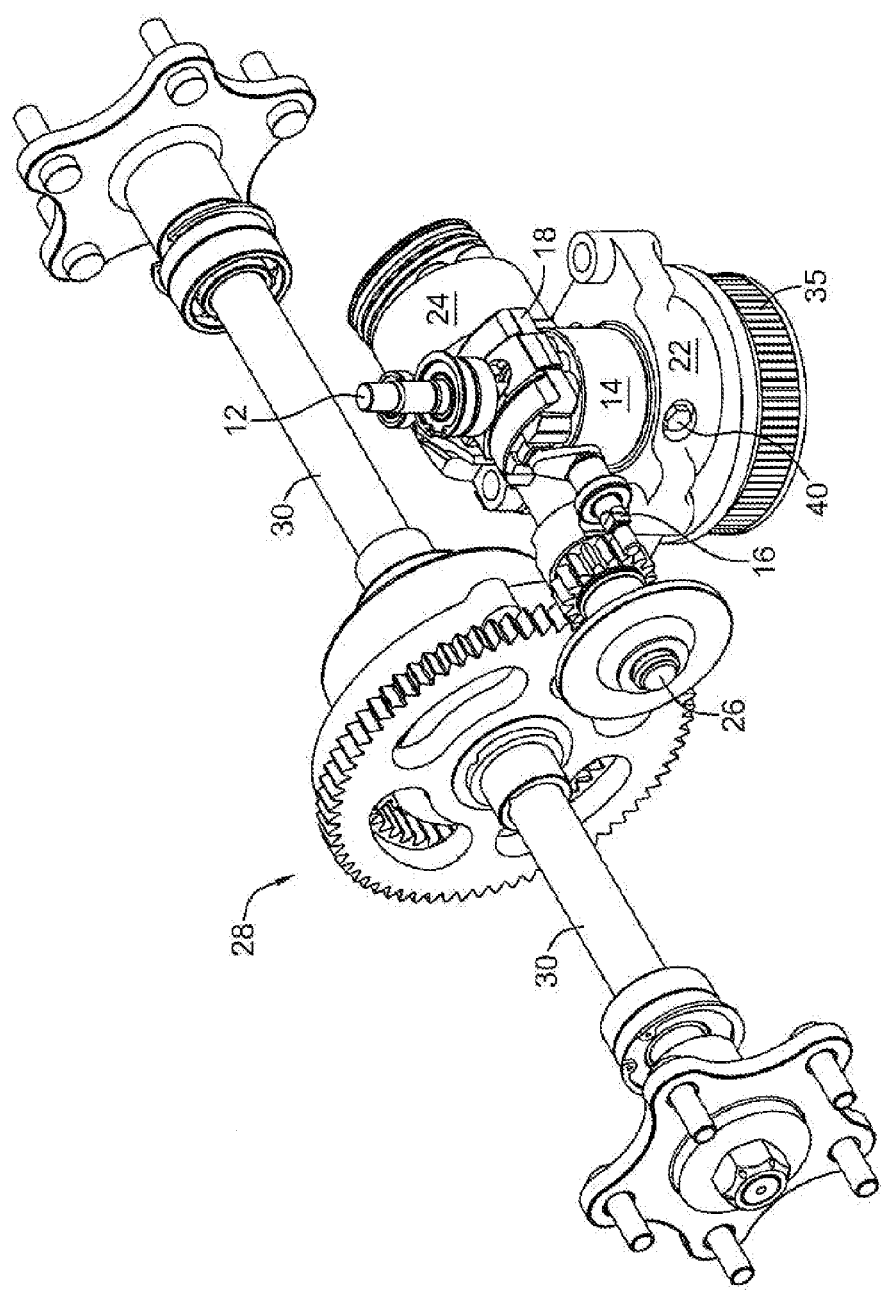
FIG. 3 is a perspective view of the internal components of the transaxle shown in FIG. 2.

FIG. 3 is a perspective view of the significant internal components of transaxle 10 from FIG. 2. Transaxle 10 is driven by a vehicle prime mover such as an engine (not shown) connected to input shaft 12. Housing 11 forms an internal main sump in which the hydrostatic and gear components described herein operate.

Input shaft 12 extends into housing 11 to rotate pump 14. A control member 16, which may be a trunnion or the like, is moved by means of a linkage or remote control (not shown) by an operator to effect the movement of swash plate 18, which then controls the amount of fluid displaced by pump 14. The fluid displaced by pump 14 moves by means of porting 20A and 20B located within center section 22 to cause movement of motor 24. Motor 24 is drivingly connected to motor shaft 26, which drives gearing 28. Gearing 28 may include a differential to drive multiple output shafts 30 or may drive a single output shaft 30. Output shafts 30 may also function as axle shafts to drive a sprocket, such as that used by a crawler, or a wheel.

Figure 4:
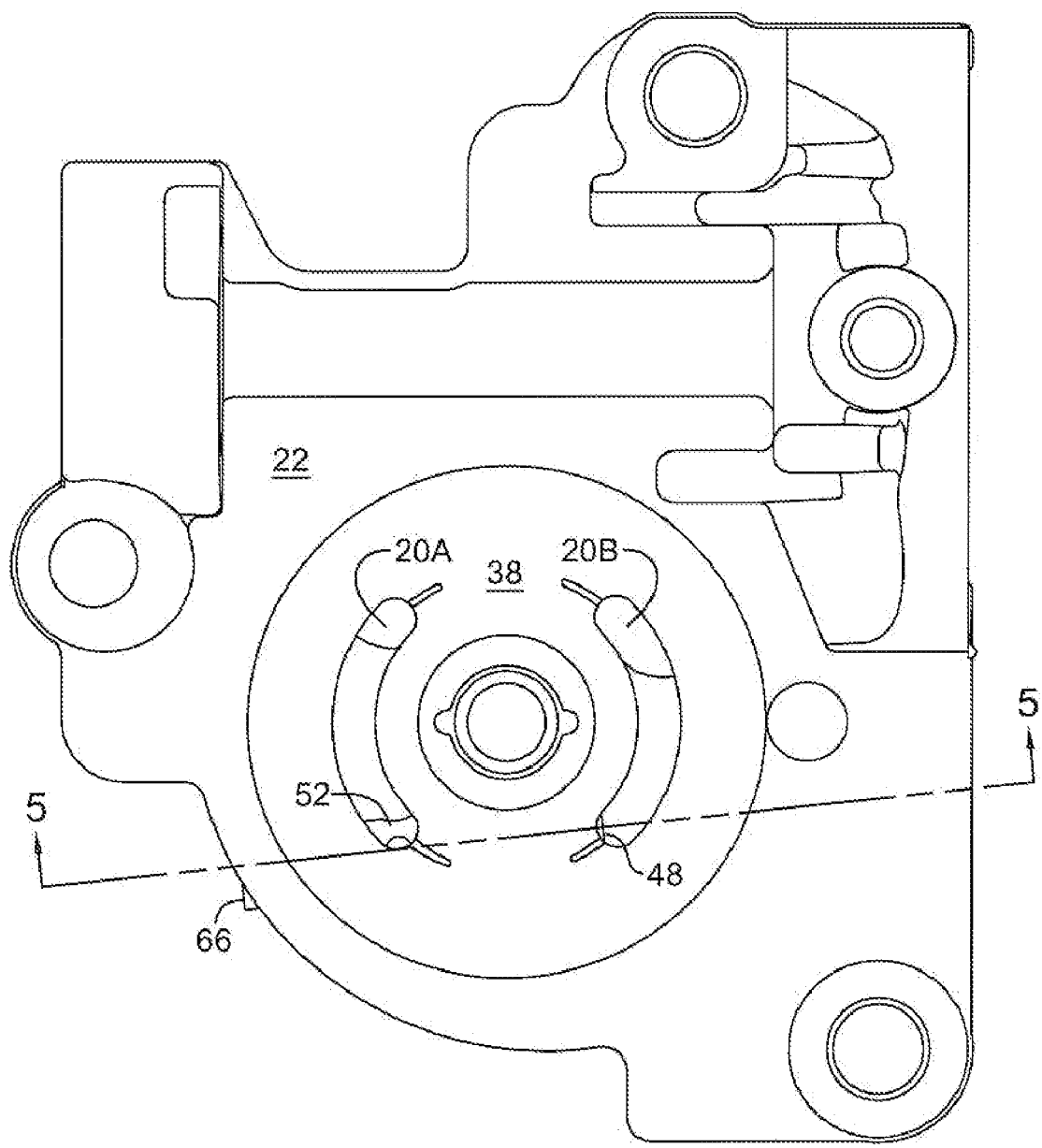
FIG. 4 is a top plan view of the center section from the transaxle shown in FIG. 2.
Figure 5:
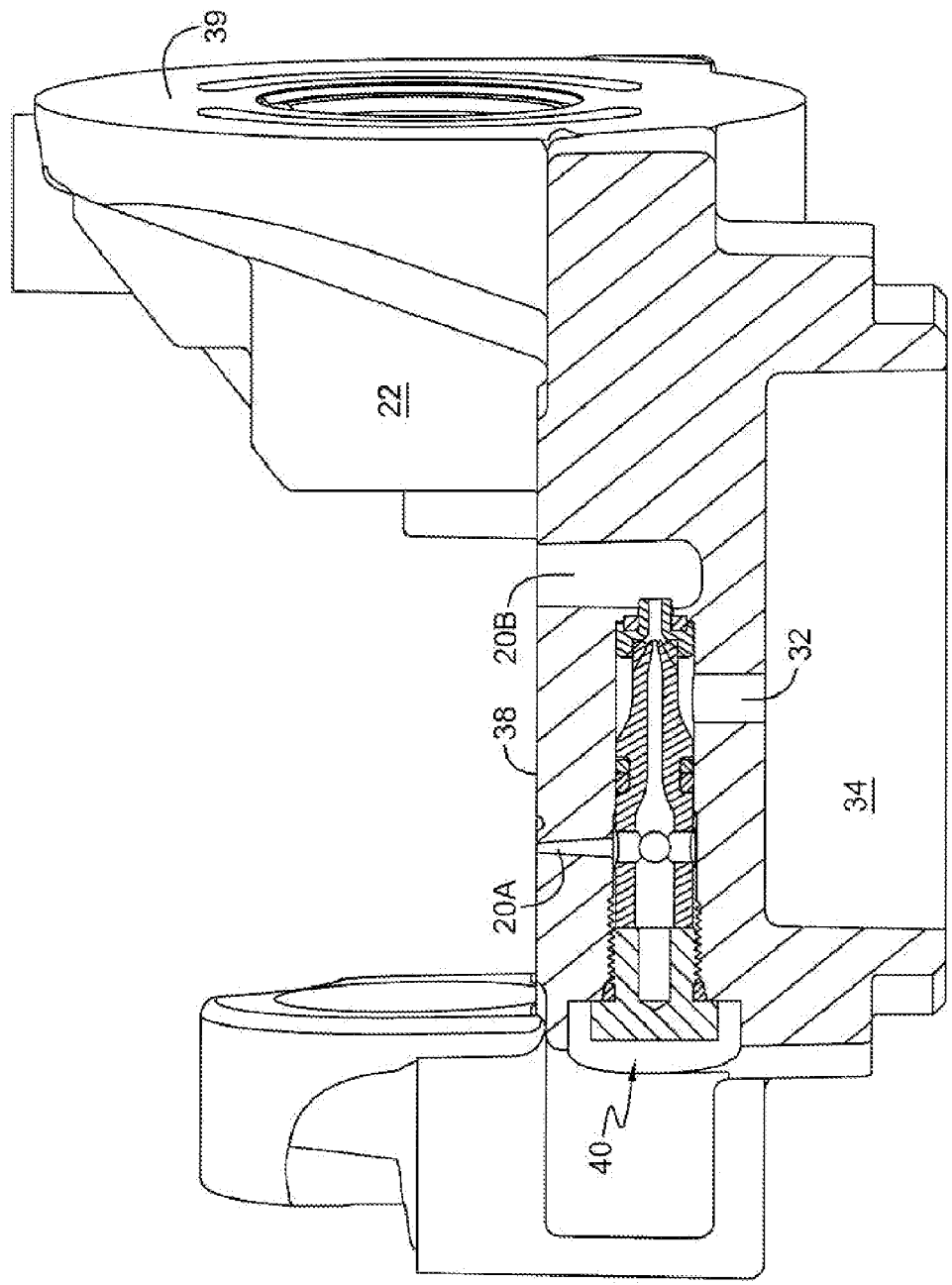
FIG. 5 is a section view along the lines 5-5 in FIG. 4.
Figure 6:
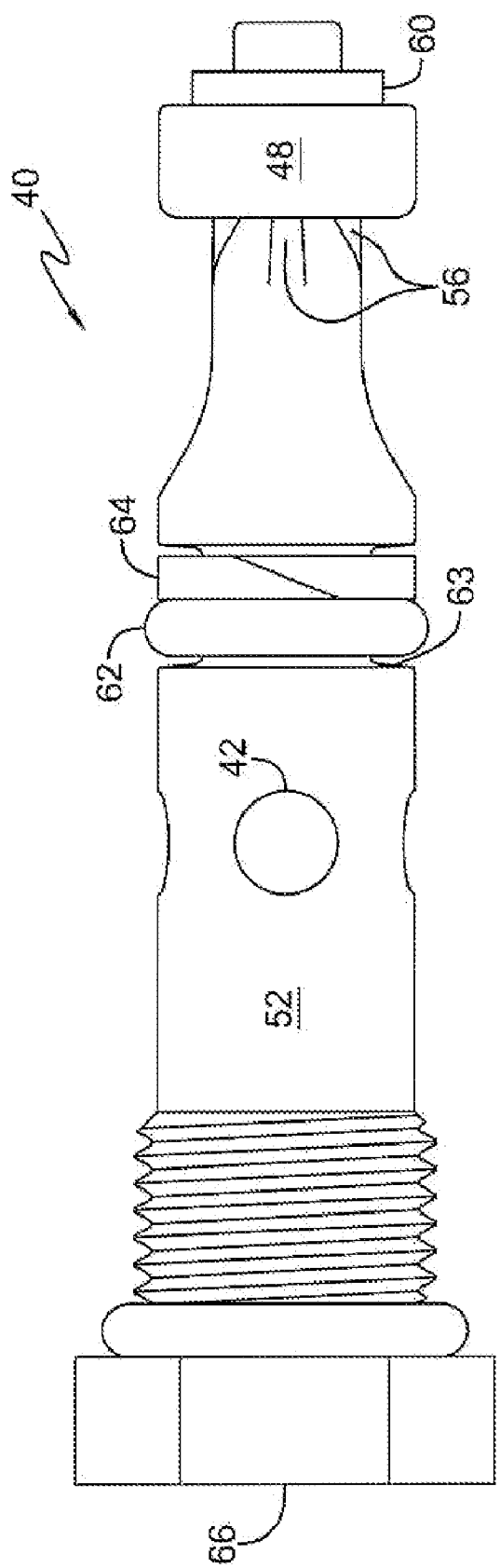
FIG. 6 is a side view of the charge pump shown in FIGS. 4 and 5.
Figure 7:
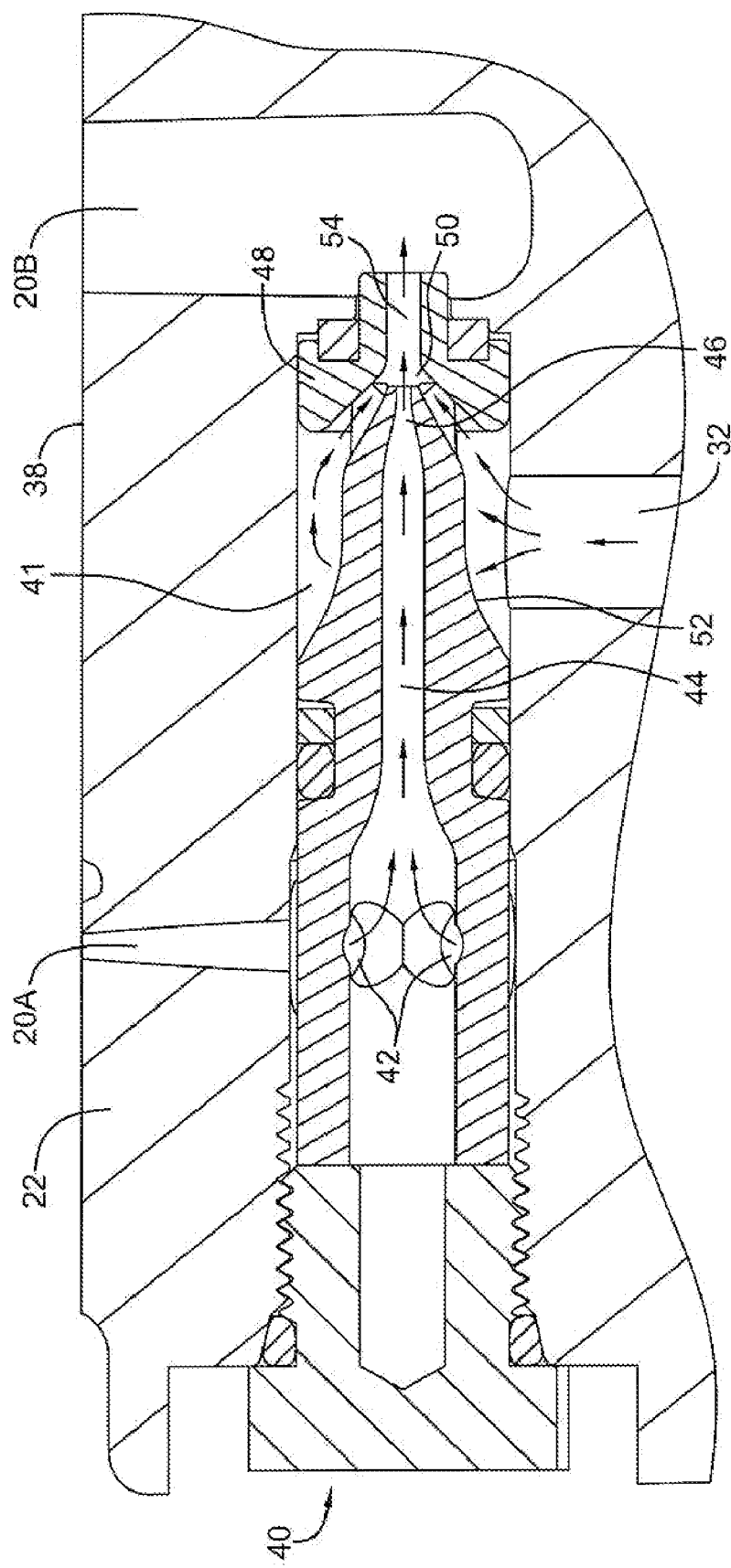
FIG. 7 is a section view similar to that of FIG. 5 with the charge pump rotated by 45 degrees about its central axis as compared to FIG. 5.

FIGS. 4 and 5 illustrate an exemplary center section 22 having a pump running surface 38 and a motor running surface 39. A charge pump 40 mounted in port 41 in the body of center section 22, as shown in FIG. 7. A filter 35 is attached to the bottom of center section 22; it could be mounted in other locations as well. Charge pump 40 is positioned between ports 20A and 20B, and is further connected by means of inlet 32 to a charge sump 34 which is formed by the center section 22 and a filter 35 or cap (not shown) in order to segregate the filtered fluid of charge sump 34 from the main sump formed in housing 11. Ports 20A and 20B are part of the porting that connects the hydraulic pump cylinder block 14 and the hydraulic motor cylinder block 24. It will be understood that whether port 20A or 20B is under high pressure will depend on whether the unit is being driven in forward or reverse. The shape of the center section is not critical, and the same function could be performed by different center sections or a port block, by having the porting formed in the housing, or other means known in the art. For a more detailed description of the particular center section described herein, absent the charge pump feature, the reader is directed to U.S. Pat. No. 5,314,387, the terms of which are incorporated herein by reference.

The functioning of charge pump 40 is shown most clearly in FIGS. 7 and 8. When hydraulic pressure is generated in port 20A, fluid travels into inlet openings 42 and then into central passage 44. As the pressurized fluid travels through central passage 44 to nozzle 46, the reduction in diameter increases the speed of fluid flow. As the fluid travels from the end of nozzle 46 across open area 50 and enters exit nozzle 48, the fluid velocity causes a vacuum pressure effect that forces fluid from charge sump 34 through inlet 32 into port 41 and thereafter into the open areas 50 between pump body 52 and exit nozzle 48. The combination of fluid from port 20A and the fluid pulled from sump 34 creates pressure in port 20B, thus charging or pressurizing port 20B.

The fluid entering inlet 32 is generally filtered by a variety of methods, and charge sump 34 may be located within housing 11 or may be in a separate reservoir (not shown) connected to inlet 32, typically with an inline filter (not shown) either internal or external to housing 11.

While the operation described above works well when port 20A is pressurized, the behavior of this device when port 20B is pressurized must also be considered, as pressurization of ports 20A and 20B typically correspond to forward and reverse directions of travel for vehicle 36. The charge feature of this design will work in only one direction (preferably forward). The dimensions of opening 54 and open areas 50 must be sized such that leakage through these features will allow pressure to build to a desired operational level in port 20B when in the reverse driving mode, while still functioning to build charge pressure in port 20B when operating in the forward driving mode.

In one variation, using a 10 cc pump block and a 21 cc motor block, nozzle 46 was chosen to have a 0.016 inch diameter, opening 54 was chosen to have a 0.025 inch diameter, and the spacing between pump body 52 and exit nozzle 48 was chosen to be 0.075 inches, yielding charge pressures in port 20B up to 1.8 PSI with system pressure in port 20A of approximately 3600 PSI.

In another variation, also using a 10 cc pump block and a 21 cc motor block, nozzle 46 was chosen to have a 0.028 inch diameter, opening 54 was chosen to have a 0.046 inch diameter, and the spacing between pump body 52 and exit nozzle 48 was kept at 0.075 inches, yielding charge pressures in port 20B in excess of 100 PSI with system pressure of approximately 1300 PSI in port 20A. The exemplary diameters yield acceptable charge pressure values, and yet are comparable to bleed orifices often used in such hydraulic systems to expand system neutral, thus allowing elimination of such bleed orifices while providing acceptable performance in the reverse direction of operation. Other dimensions could be used depending upon system requirements.

While only one charge pump 40 is shown between ports 20A and 20B, it may be desirable in some applications to include a second charge pump 40 between ports 20B and 20A, oriented such that when port 20B is pressurized, charge pressure is provided to port 20A. The addition of a second charge pump will enable the unit to have a charge pump feature in both forward and reverse directions of operation. Also, because charge pump 40 is intended to provide sufficient make up fluid to port 20B as shown, an additional valve such as a check valve between sump 34 and port 20B may not be required. Similarly, if a second pump 40 is provided between ports 20B and 20A, then a check valve between sump 34 and port 20A may not be required. Check valves may be still desirable in certain applications.

In order to maintain production efficiencies, it is preferable that such a pump be pre-assembled as much as possible. FIGS. 8-10 depict a partially preassembled configuration of pump 40. Pump body 52 comprises projections 56 that may be brazed or press fit into recesses 58 in exit nozzle 48. Seal 60, which is preferably an elastomeric material, fits onto exit nozzle 48 and is retained by the grip of seal 60 on exit nozzle 48, though other methods of retention may be used. Seal 60 is an optional seal to prevent fluid flow about the periphery of exit nozzle 48, particularly when port 20B is under pressure. The gap between exit nozzle 48 and charge pump port 41 adds uncertainty to the leakage area when port 20B is under pressure, and seal 60 thus acts to eliminate that additional uncertainty. O-ring 62 prevents undesired leakage about the periphery of pump body 52 and is located in a groove 63 on pump body 52. A backup ring 64 may also be positioned in groove 63 and used to prevent extrusion of O-ring 62 when port 20A is under pressure. All the components described, including pump body 52, exit nozzle 48, seal 60, O-ring 62 and backup ring 64, are assembled as a single device suitable for positioning in an appropriately sized port 41, and then restrained by a plug 66.

Figure 11:
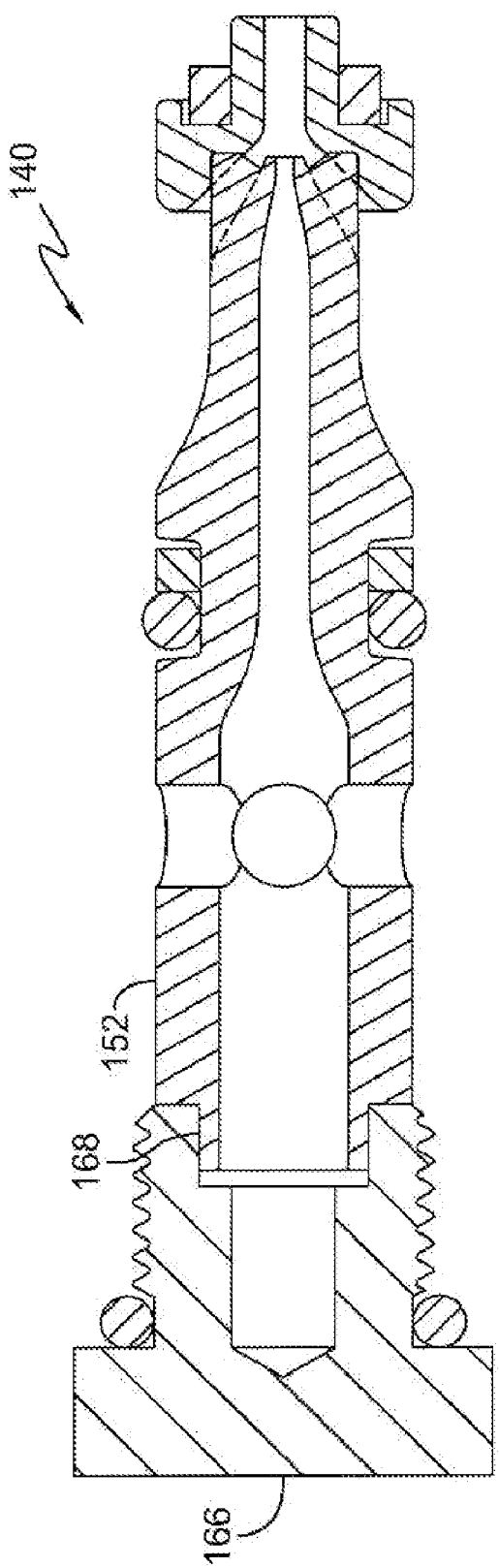
FIG. 11 is a section view of another embodiment of the charge pump in accordance with the present invention.

Another embodiment of the invention is presented in FIG. 11. In this embodiment, charge pump 140 is a single assembly that includes components similar to that of the first embodiment mated with plug 166. The mating feature 168 between plug 166 and pump body 152 may be a press fit interface, a brazed interface, or other mating interfaces known in the art. This embodiment may be completely assembled away from the assembly line and then installed into an appropriate port 41 during the manufacturing process.

Fabrication of small parts such as pump body 52 and nozzle 48 can represent a challenge. For this reason, metal injection molding (MIM) is preferred as the fabrication technique for such parts.

It is to be understood that the above description of the invention should not be used to limit the invention, as other embodiments and uses of the various features of this invention will be obvious to one skilled in the art. This invention should be read as limited by the scope of its claims only.

The invention claimed is:

1. A hydraulic drive device, comprising:
   a hydraulic member located in a fluid sump and having at least a first running surface for a rotatable cylinder block formed thereon;
   hydraulic porting formed in the hydraulic member and comprising a first port and a second port extending into the hydraulic member from the first running surface, and a valve port extending into the hydraulic member from an exterior surface thereof and intersecting both the first and second ports; and
   a venturi charge pump disposed in the valve port and in fluid communication with both the first and second ports and the fluid sump, the venturi charge pump comprising a valve body located substantially entirely within the hydraulic member, a first opening of the valve body located proximate to the first port, and a second opening of the valve body located proximate to the second port.

2. The hydraulic drive device of claim 1, wherein the venturi charge pump is formed as a unitary assembly prior to insertion into the valve port.

3. The hydraulic drive device of claim 2, wherein the venturi charge pump is retained in the hydraulic member by a plug.

4. The hydraulic drive device of claim 1, wherein a filter is interposed between the fluid sump and the venturi charge pump.

5. The hydraulic drive device of claim 4, wherein the hydraulic member further comprises a charge sump, and the filter separates the charge sump from the fluid sump.

6. The hydraulic drive device of claim 1, further comprising a second running surface for a second rotatable cylinder block formed on the hydraulic member.

7. The hydraulic drive device of claim 6, further comprising a plurality of gears disposed in the fluid sump and at least one axle shaft, wherein the plurality of gears is drivingly engaged to the at least one axle shaft and driven by a hydraulic motor rotatably disposed on the second of the running surfaces.

8. The hydraulic drive device of claim 7, further comprising a hydraulic pump rotatably disposed on the first of the running surfaces and driven by a pump shaft, and a motor shaft driven by the hydraulic motor and disposed generally perpendicular to the pump shaft.

9. The hydraulic drive device of claim 1, wherein the venturi charge pump comprises a nozzle fabricated by metal injection molding.

10. A hydraulic drive device comprising:
a housing comprising a sump;
a hydrostatic transmission mounted in the sump and comprising a hydraulic pump and a hydraulic motor connected together through porting, the porting comprising a first pressure side and a second pressure side, wherein, during operation of the hydrostatic transmission, one of the pressure sides is at low pressure and the other pressure side is at high pressure; and
a unidirectional charge pump hydraulically connected to the sump and the porting, the charge pump comprising a first opening, a second opening and a passage connecting the first opening and second opening, wherein when the first pressure side is at high pressure, fluid flows through the passage from the first opening to the second opening without being charged by the charge pump, and when the second pressure side is at high pressure, fluid flows through the passage from the second opening to the first opening and charged fluid is provided by the charge pump to the first pressure side.

11. The hydraulic drive device of claim 10, wherein the charge pump comprises a venturi pump.

12. The hydraulic drive device of claim 10, further comprising a charge sump hydraulically connected to the charge pump and a filter interposed between the sump and the charge sump.

13. The hydraulic drive device of claim 10, further comprising a plurality of gears disposed in the sump, and at least one axle shaft, wherein the plurality of gears is drivingly engaged to the at least one axle shaft and driven by the hydraulic motor.

14. The hydraulic drive device of claim 10, further comprising a pump shaft drivingly engaged to the hydraulic pump, and a motor shaft driven by the hydraulic motor, wherein the pump shaft and motor shaft are mounted generally perpendicular to each other in the hydraulic drive device.

15. The hydraulic drive device of claim 10, wherein the charge pump further comprises a nozzle proximate to the second opening, wherein the nozzle is fabricated by metal injection molding.

16. A hydraulic drive device comprising:
a housing comprising a sump;
a center section disposed in the sump and comprising a pump running surface having first and second ports formed thereon, and a motor running surface having third and fourth ports formed thereon;
hydraulic porting formed in the center section and comprising a first pressure side hydraulically connecting the first and third ports, and a second pressure side hydraulically connecting the second and fourth ports;
a hydraulic pump disposed on the pump running surface and in fluid communication with the first and second ports;
a hydraulic motor disposed on the motor running surface and in fluid communication with the third and fourth ports; and
a charge pump hydraulically connected to the sump and comprising a first opening proximate to the first pressure side, and a second opening proximate to the second pressure side, wherein fluid flows through the charge pump from the first opening to the second opening when the first pressure side is under high pressure, and wherein fluid flows through the charge pump from the second opening to the first opening when the second pressure side is under high pressure, and wherein the charge pump provides charge fluid to the hydraulic porting only when the first pressure side is under high pressure.

17. A hydraulic pump and motor system, comprising:
a hydraulic pump and a hydraulic motor connected together through hydraulic porting, the hydraulic porting comprising a first pressure side connecting the pump to the motor and a second pressure side connecting the pump and the motor; and
a venturi charge pump hydraulically connected to a sump and comprising an inlet proximate to the first pressure side and an outlet proximate to the second pressure side, wherein fluid enters the venturi charge pump through the inlet when the first pressure side is under high pressure, and wherein fluid enters the venturi charge pump through the outlet when the second pressure side is under high pressure, and wherein the venturi charge pump is capable of providing charge pressure only when the second pressure side is under high pressure.

18. The hydraulic pump and motor system of claim 17, wherein the hydraulic porting is formed in a unitary center section on which the hydraulic pump and the hydraulic motor are disposed.

19. A hydraulic pump and motor system, comprising:
a hydraulic pump and a hydraulic motor connected together through hydraulic porting, the hydraulic porting comprising a first pressure side and a second pressure side, wherein during operation either the first or the second pressure side is under high pressure;
a hydraulic member in which at least a portion of the hydraulic porting is formed and on which at least one of the pump and motor is supported; and
a first venturi charge pump disposed in the hydraulic member and connected to a sump and comprising a first inlet and a first outlet, wherein the first venturi charge pump receives fluid through the first inlet when the first pressure side is at high pressure, and wherein the first venturi charge pump receives fluid through the first outlet when the second pressure side is at high pressure, and wherein the first venturi charge pump only provides charge fluid when the first pressure side is at high pressure.

20. The hydraulic pump and motor system of claim 19, further comprising a filter positioned between the sump and the first inlet to the first venturi charge pump.

21. The hydraulic pump and motor system of claim 20, wherein a charge sump is formed within the hydraulic member and the filter is attached to the hydraulic member to separate the charge sump from the sump.

22. The hydraulic pump and motor system of claim 19, further comprising a second venturi charge pump disposed in the hydraulic member and connected to the sump, the second venturi charge pump comprising a second inlet and a second outlet, wherein the second venturi charge pump receives fluid through the second inlet when the second pressure side is at high pressure, and wherein the second venturi charge pump receives fluid through the second outlet when the first pressure side is at high pressure, and wherein the second venturi charge pump only provides charge fluid when the second pressure side is at high pressure.

* * * * *